(12) United States Patent
Meredith et al.

(10) Patent No.: US 10,747,683 B2
(45) Date of Patent: Aug. 18, 2020

(54) TRANSLATION LOOKASIDE BUFFER SWITCH BANK

(71) Applicants: AT&T Mobility II LLC, Atlanta, GA (US); AT&T Intellectual Property I, L.P., Atlanta, GA (US)

(72) Inventors: Sheldon Kent Meredith, Roswell, GA (US); Brandon B. Hilliard, Woodstock, GA (US); William Cottrill, Canton, GA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 105 days.

(21) Appl. No.: 16/030,583

(22) Filed: Jul. 9, 2018

(65) Prior Publication Data

US 2018/0314645 A1    Nov. 1, 2018

Related U.S. Application Data

(63) Continuation of application No. 15/888,961, filed on Feb. 5, 2018, now Pat. No. 10,019,379, which is a continuation of application No. 15/097,612, filed on Apr. 13, 2016, now Pat. No. 9,886,393.

(51) Int. Cl.
*G06F 12/00* (2006.01)
*G06F 12/1045* (2016.01)
*G06F 12/1027* (2016.01)
*G06F 12/1072* (2016.01)
(Continued)

(52) U.S. Cl.
CPC ...... *G06F 12/1045* (2013.01); *G06F 12/1027* (2013.01); *G06F 12/1072* (2013.01); *G06F 12/0811* (2013.01); *G06F 12/0813* (2013.01); *G06F 2212/1024* (2013.01); *G06F 2212/1044* (2013.01); *G06F 2212/68* (2013.01); *G06F 2212/681* (2013.01)

(58) Field of Classification Search
CPC .................. G06F 12/1045; G06F 12/1027
USPC ......................................................... 711/207
See application file for complete search history.

(56) References Cited

U.S. PATENT DOCUMENTS

| 4,682,281 A | 7/1987 | Woffinden |
|---|---|---|
| 7,131,029 B2 | 10/2006 | Quach |
| 7,181,590 B2 | 2/2007 | Kottapalli et al. |

(Continued)

OTHER PUBLICATIONS

Bhattacharjee, Abhishek, "Large-Reach Memory Management Unit Caches", Dated 2013, pp. 1-12.

*Primary Examiner* — Jae U Yu

(57) ABSTRACT

Example devices are disclosed. For example, a device may include a processor, a plurality of translation lookaside buffers, a plurality of switches, and a memory management unit. Each of the translation lookaside buffers may be assigned to a different process of the processor, each of the plurality of switches may include a register for storing a different process identifier, and each of the plurality of switches may be associated with a different one of the translation lookaside buffer buffers. The memory management unit may be for receiving a virtual memory address and a process identifier from the processor and forwarding the process identifier to the plurality of switches. Each of the plurality of switches may be for connecting the memory management unit to a translation associated with the switch when there is a match between the process identifier and the different process identifier stored by the register of the switch.

20 Claims, 4 Drawing Sheets

(51) Int. Cl.
   *G06F 12/0811*   (2016.01)
   *G06F 12/0813*   (2016.01)

(56) References Cited

U.S. PATENT DOCUMENTS

| | | |
|---|---|---|
| 7,383,374 B2 | 6/2008 | Yamada et al. |
| 8,091,090 B2 | 1/2012 | De Dinechin et al. |
| 8,285,969 B2 | 10/2012 | Khubaib et al. |
| 8,880,844 B1 | 11/2014 | Bhattacharjee et al. |
| 9,081,707 B2 | 7/2015 | Conrad et al. |
| 9,152,572 B2 | 10/2015 | Ronen et al. |
| 9,251,103 B2 | 2/2016 | Mehta |
| 2005/0022192 A1 | 1/2005 | Kim |
| 2012/0117301 A1 | 5/2012 | Wingard |
| 2013/0111151 A1 | 5/2013 | Sedlar et al. |
| 2015/0220436 A1 | 8/2015 | Cooray et al. |
| 2015/0301939 A1 | 10/2015 | Bybell et al. |

TRANSLATION LOOKASIDE BUFFER SWITCH BANK

This application is a continuation of U.S. patent application Ser. No. 15/888,961, filed Feb. 5, 2018, now U.S. patent Ser. No. 10/019,379, which is a continuation of U.S. patent application Ser. No. 15/097,612, filed Apr. 13, 2016, now U.S. Pat. No. 9,886,393, all of which are herein incorporated by reference in its entirety.

The present disclosure relates generally to mapping virtual memory addresses to physical memory addresses, and more particularly to architectures where a plurality of translation lookaside buffers may be assigned to processes of a processor and where the processor may be connected to one of the plurality of translation lookaside buffers via a switch of a switch bank.

BACKGROUND

When computer processors are operating out of a virtual memory, virtual memory addresses (VMAs) are mapped to physical memory addresses (PMAs) to enable memory operations to be performed on a main (physical) memory. A page table may be stored in a known portion of the physical memory and may contain entries mapping VMAs to PMAs for the various processes running on the processor. The page table may store entries on a per-page basis, e.g., in 4 KB pages. However, since accessing the page table can still be time consuming, a computing device may include a translation lookaside buffer (TLB) that is closer to the processor than the main memory and comprises a smaller cache to store entries mapping the VMAs to PMAs for a number of memory pages. For example, a memory management unit (MMU) may handle memory access requests for a processor, and may first search the TLB for an entry mapping a VMA to a PMA for a memory access request before searching the page table, which may be referred to as a "page walk." The size of the TLB may be selected based upon a tradeoff between how much memory can be simultaneously mapped in the TLB and how long it takes to scan the TLB. For example, TLBs are often between 64-4096 entries, with a typical TLB size of 256 entries, which corresponds to only 1 MB of virtual memory when utilizing a page size of 4 KB.

SUMMARY

In one example, the present disclosure discloses a device. For example, the device may include a processor, a plurality of translation lookaside buffers, a plurality of switches, and a memory management unit. Each of the translation lookaside buffers may be assigned to a different process of the processor, each of the plurality of switches may include a register for storing a different process identifier, and each of the plurality of switches may be associated with a different one of the translation lookaside buffer buffers. The memory management unit may be for receiving a virtual memory address and a process identifier from the processor and forwarding the process identifier to the plurality of switches. Each of the plurality of switches may be for connecting the memory management unit to a translation lookaside buffer associated with the switch when there is a match between the process identifier and the different process identifier stored by the register of the switch.

In another example, the present disclosure discloses a memory management unit and a method performed by a memory management unit. For instance, the method may include a memory management unit receiving a virtual memory address and a process identifier from a processor, e.g., from a central processing unit, and forwarding the process identifier to a plurality of switches. In one example, each of the plurality of switches may include a register for storing a different process identifier, each of the plurality of switches may be associated with a different translation lookaside buffer of a plurality of translation lookaside buffers assigned to the processor, each of the plurality of translation lookaside buffers may be assigned to a different process of the processor, and each of the plurality of switches may be for connecting the memory management unit to a translation lookaside buffer of the plurality of translation lookaside buffers that is associated with the switch when there is a match between the process identifier and the different process identifier stored by the register of the switch. The method may further include the memory management unit, accessing one of the plurality of translation lookaside buffers when the memory management unit is connected to the one of the plurality of translation lookaside buffers by one of the plurality of switches and searching for an entry that maps the virtual memory address to a physical memory address in the one of the plurality of translation lookaside buffers.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
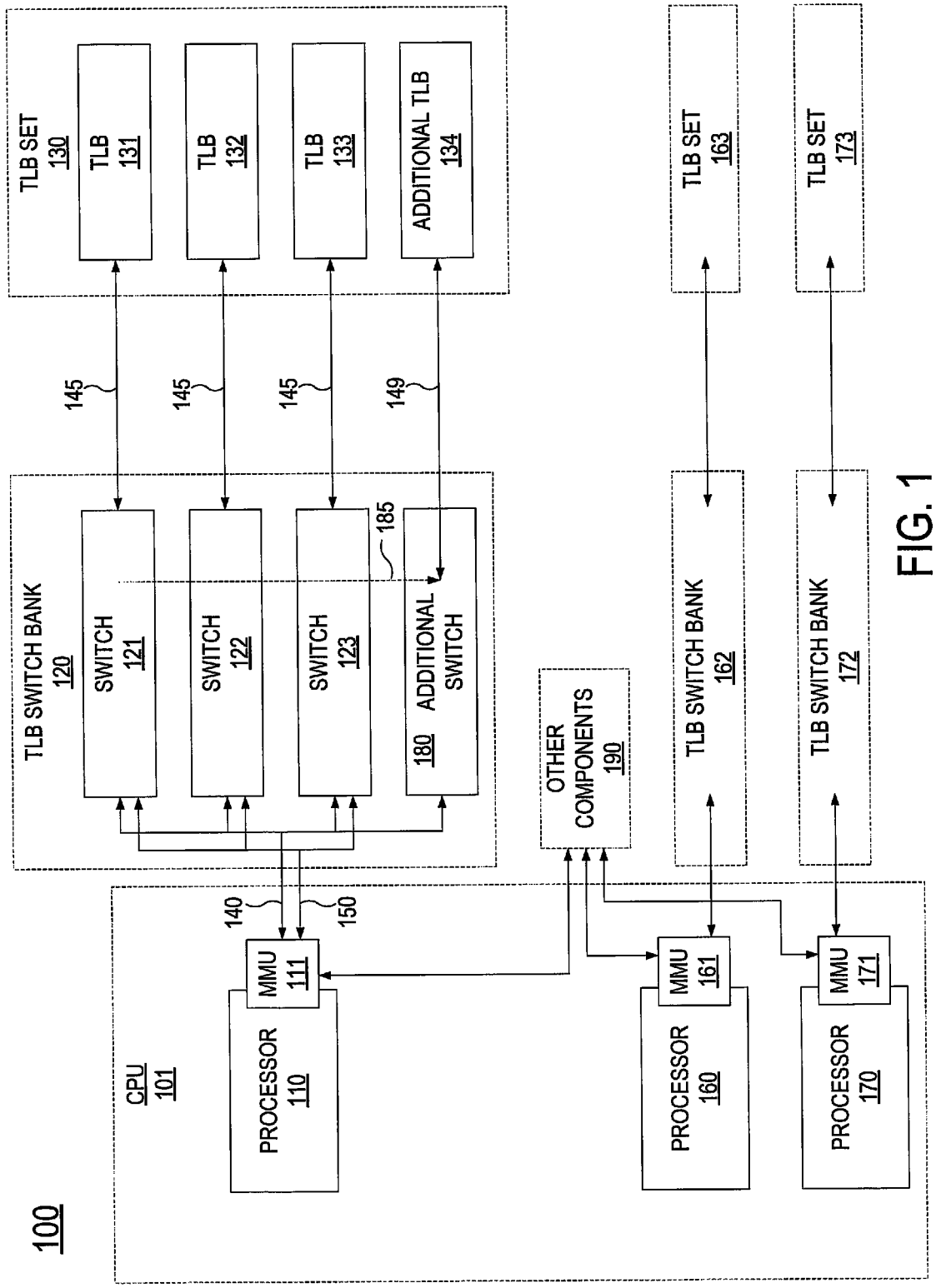
FIG. 1 illustrates an example device or system related to the present disclosure.

When using virtual memory, a limiting factor to CPU/core processing speed is the dynamic mapping of virtual memory addresses (VMA) to physical memory addresses (PMA) using a translation lookaside buffer (TLB). A typical TLB may map the virtual to physical addresses for between 64 and 4096 memory pages generally containing 4 KB of content. However, when a single processor core (broadly, a "processor") is used by many different processes sequentially, each time a new process needs to use the processor, the TLB may need to be flushed and reloaded with those pages needed for that process.

In accordance with the present disclosure, a plurality of TLBs is deployed for each processing core, or processor. The plurality of TLBs may be dynamically assigned to processes with high processor utilizations. An additional TLB is also deployed that remains available for new processes and low utilization processes that are not assigned a dedicated TLB. In other words, the additional TLB is shared between all processes that are not assigned to one of the plurality of TLBs. In one example, a switch bank comprising a plurality of switches may be deployed between the processor and the plurality of TLBs. Each switch may be paired with one of the plurality of TLBs and may comprise a register to store a process identifier (ID) associated with a process that has been assigned to a respective one of the plurality of TLBs. If a processor has a memory access task to perform for a particular process, it may submit a process ID and VMA to a memory management unit (MMU). The MMU may submit the process ID to the plurality of switches. The process ID may then be compared to the process IDs stored in each register of each switch simultaneously. If there is a match in any register, a hardware connection may be made between the MMU and the TLB via the switch containing the matching register.

In one example, an open collector line may tie together the outputs of the plurality of switches and may control an additional switch that is paired with the additional/shared TLB. The open collector line may float high, but if any of the switches matches the process ID, it may pull the open collector line low, opening the additional switch and blocking a connection to the additional/shared TLB. However, when the processor has a task to perform for a process without its own dedicated TLB, the open collector line may continue to float high and thereby maintain the additional switch in a closed state, providing a connection between the MMU and the additional/shared TLB.

In one example, the memory utilizations associated with each process (or process ID) is tracked. If there is a change in the processes having the greatest utilizations over a given time period, one or more of the process IDs in one or more of the registers in the plurality of switches may be substituted for a different process ID of a new high-utilization process or a process that may have an increased memory utilization. In one example, 4-5 switches may be provided to support 4-5 dedicated TLBs. For instance, in a personal computer, there may be 4-5 applications that typically have high memory utilizations, while there may be many more processes, e.g., greater than 30, that have infrequent and/or low volume memory utilizations. Thus, the ongoing flushing of a single shared TLB to support these less intensive processes may be avoided through the use of a plurality of TLBs that may be assigned to different processes. These and other aspects of the present disclosure are discussed in greater detail below in connection with the examples of FIGS. 1-4.

To aid in understanding the present disclosure, FIG. 1 illustrates a block diagram depicting one example of a system, or computing device 100 suitable for performing or enabling the steps, functions, operations and/or features described herein. As illustrated in FIG. 1, computing device 100 may comprise a central processing unit (CPU) 101 including a plurality of cores or processors, e.g., processors 110, 160, and 170. Computing device 100 may also include a plurality of switch banks, e.g., TLB switch banks 120, 162, and 172, and a plurality of TLB sets, e.g., TLB set 130, TLB set 163, and TLB set 173. For ease of illustration, only details of TLB switch bank 120 and TLB set 130 are depicted in FIG. 1. A memory management unit (MMU) is provided for each processor, e.g., MMUs 111, 161, and 171. As illustrated in FIG. 1, MMUs 111, 161, and 171 may be integrated with the respective processors, and/or may be built upon a same die or chip as the processors 110, 160, and 170. However, in another example, MMUs 111, 161, and 171 may be connected to the respective processors via a bus.

In one example, each of MMUs 111, 161, and 171 may comprise an application specific integrated circuit (ASIC), a programmable read only memory (PROM), a programmable logic device (PLD), such as a programmable gate array (PGA), and so forth.

In one example, MMU 111 is connected via links 150 to a plurality of switches, e.g., switches 121, 122, and 123. As mentioned above, each switch may each include a register for storing a different process ID of a process that is assigned to a TLB that is paired with the switch. For instance, switches 121, 122, and 123 are paired with TLBs 131, 132, and 133, respectively, in TLB set 130. To illustrate, when processor 110 has a memory access task to perform, the processor may submit a memory access request along with a process ID and virtual memory address (VMA) to the MMU 111. Links 150 may be used by the MMU 111 to provide the process ID to each of the switches 121-123. If the process ID submitted by the MMU 111 over links 150 matches one of the different process IDs stored in a register of one of switches 121, 122, or 123, the matching switch may provide a hardware connection between the MMU 111 and a TLB associated with the matching switch. For example, if the process ID submitted by MMU 111 matches a process ID stored in switch 122, the switch 122 may provide a hardware connection between MMU 111 and TLB 132 via links 140 and one of the links 145.

In one example, each of TLBs 131-133 may comprise a random access memory (RAM), such as static random access memory (SRAM), or the like. As illustrated in FIG. 1, TLB switch bank 120, further includes an additional switch 180 that is paired with an additional TLB 134 of TLB set 130. Additional TLB 134 may also comprise a SRAM, for example. In one example, the additional TLB 134 is for storing entries mapping VMAs to PMAs for processes of the processor that are not assigned to one of the TLBs 131-133 and for which corresponding process IDs are not stored in one of the switches 121-123. An open collector line 185 may tie together the outputs of the plurality of switches 121-123 and may control the additional switch 180. The open collector line 185 may float high, but if any of the switches 121-123 matches the process ID, it may pull the open collector line 185 low, opening the additional switch 180 and blocking a connection to the additional TLB 134 via link 149. However, when the processor 110 has a task to perform for a process without its own dedicated TLB (e.g., one of TLBs 131-133), the open collector line 185 may continue to float high and thereby maintain the additional switch 180 in a closed state, providing a connection between the MMU 111 and the additional TLB 134 via links 140 and 149.

Once connected to one of the TLBs 131-133 or to the additional TLB 134, the MMU 111 may traverse the TLB to which the MMU 111 is connected. For instance, the entries in the TLB may be scanned for an entry that matches the VMA. If there is a match, the MMU 111 may retrieve the PMA associated with the VMA from the entry. The MMU 111 may then use the PMA to search for an entry in a cache, e.g., a level 1 (L1) cache, a level 2 (L2) cache, and so forth (represented by "other components" 190), and/or to access a physical memory (also represented by "other components" 190) using the PMA to locate the correct location in the physical memory (e.g., if there is no "cache hit", or a "cache miss"). For instance the cache(s) may comprise physically indexed caches. On the other hand, if there is no matching entry for the VMA in the TLB to which the MMU 111 is connected (e.g., a "TLB miss"), the MMU 111 may connect to a level 2 (L2) TLB. For instance, "other components 190" may represent a L2 TLB that may store a larger number of entries than additional TLB 134. In one example, such an L2 TLB may be for processor 110/MMU 111. In another example, such an L2 TLB may be shared among multiple processor/MMUs and may contain entries mapping VMAs to PMAs for multiple processes on processors.

Alternatively, or in addition, the MMU 111 may perform a "page walk" by accessing a page table stored in a designated portion of the physical memory and which contains a full set of VMA to PMA mappings for all processes. As referred to herein, the physical memory may alternatively be referred to as a "memory device" or "main memory." In one example, the MMU may perform a page walk after a TLB miss in an L2 TLB, or after searching one of TLBs 131-133 and/or additional TLB 134 if there is no L2 TLB. A page walk may involve the MMU 111 finding an entry that matches the VMA in the page table. In addition, when a matching entry is found, the MMU 111 may also write the entry into an appropriate TLB, and then re-search the TLB for the entry. For example, if processor 110 has a memory access task to perform for a process that has been assigned to TLB 132, when the MMU 111 attempts to perform the task on behalf of processor 110, the MMU 111 may be connected to TLB 132 via switch 122. If there is no matching entry for the VMA found in TLB 132, the MMU 111 may perform a page walk in the physical memory, obtain an entry that maps the VMA to a PMA, and may then write the entry to the TLB 132. The MMU 111 may then re-search TLB 132 to attempt to find a matching entry for the VMA, which will then be found since the matching entry has just been written to TLB 132. The MMU 111 may then retrieve the PMA from the matching entry and use the PMA to search one or more caches and/or to access the physical memory.

In one example, the MMU 111 may also track memory utilizations of different processes that are running on processor 110. For instance, the MMU 111 may track the memory utilizations in order to rank the plurality of processes based upon the respective memory utilizations. The rankings may be based upon a number of memory access requests, a number of read requests, a number of write requests, a volume of memory accessed, e.g., a number of kilobytes accessed, and so forth. In one example, the memory utilizations may be with respect to a sliding time window. For instance, the rankings may be based upon the number of memory access requests in the most recent 60 second interval, or the like. The MMU 111 may then assign TLBs and switches to certain processes that have memory utilization ranks that are above a threshold. For instance, in TLB switch bank 120 and TLB set 130, there are three switches and three respective TLBs that may be assigned/dedicated to processes that are running on processor 110. Thus, in one example, the three processes with the highest/greatest/most memory utilizations may be assigned to TLBs 131-133 and switches 121-123, while all other processes may share the additional TLB 134, which may be accessed via the additional switch 180 and lines 140 and 149. As the memory utilization rankings may change, the processes assigned to TLBs 131-133 and switches 121-123 may also change. Accordingly, the MMU 111 may overwrite the registers in switches 121-123 with process IDs of new/different processes. The MMU 111 may also flush the TLBs 131-133 and write new entries to the TLBs for the new processes that may be assigned to the TLBs 131-133.

It should be noted that the system 100 has been simplified. In other words, the system 100 may be implemented in a different form than that illustrated in FIG. 1. For example, the system 100 may be expanded to include other components (not shown) such as a number of additional cores, TLB switch banks, TLB sets, and so forth, or additional TLBs per TLB set, without altering the scope of the present disclosure. Similarly, system 100 may omit various elements, substitute elements for components or devices that perform the same or similar functions and/or combine elements that are illustrated as separate components. For example, one or more of the processors in CPU 101 may not be provided with a TLB switch bank and multiple TLBs. In another example, MMUs may comprise separate components that are external to the CPU 101. In another example, additional TLB 143 may comprise a multi-level TLB, e.g., with an L1 TLB, an L2 TLB, and so forth. In still another example, the additional TLB 143 may be shared among a plurality of processors. For instance, processors 110, 160, and 170 may all utilize a same shared/additional TLB. Thus, these and other modifications of the system 100 are all contemplated within the scope of the present disclosure.

Figure 2:
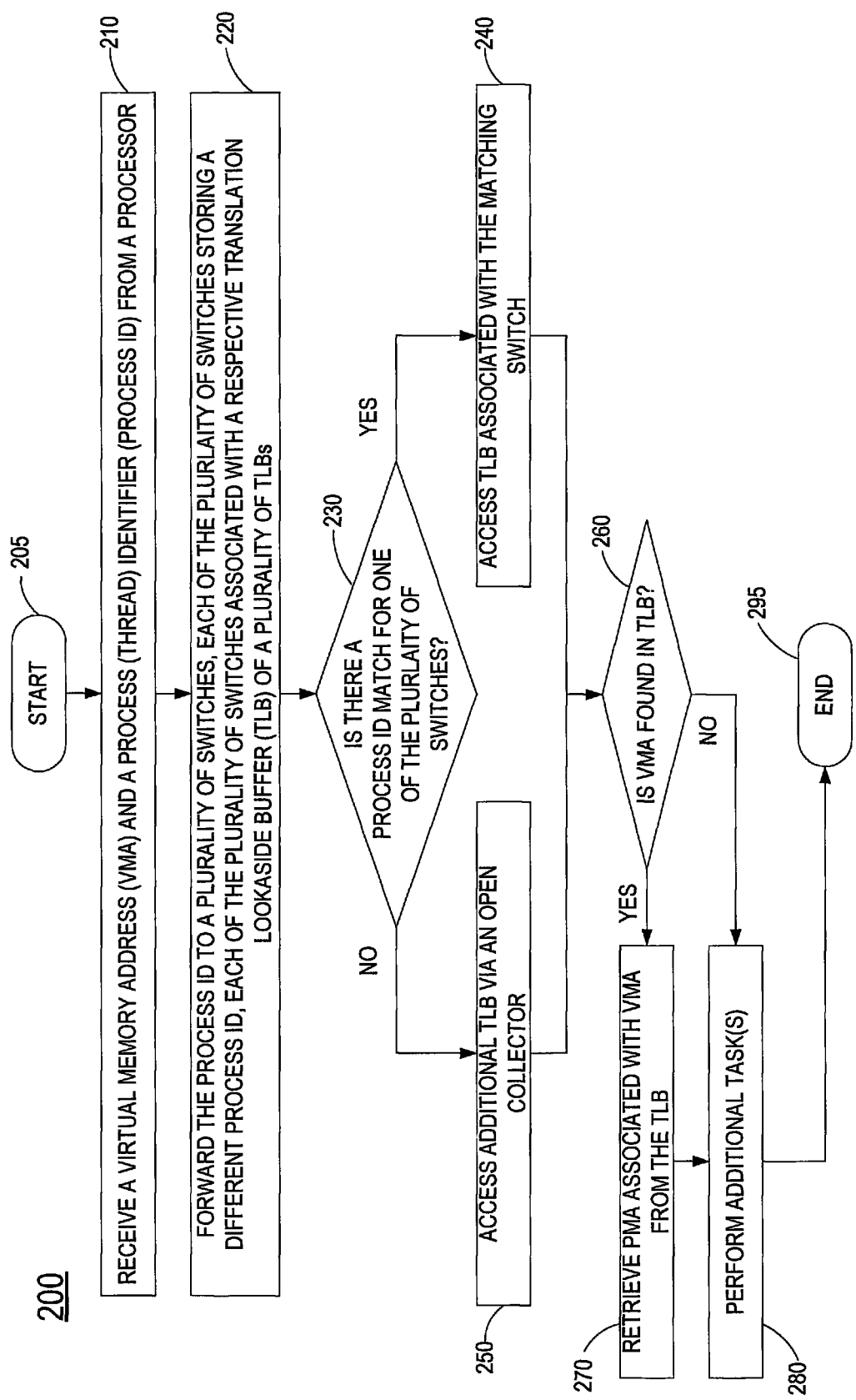
FIG. 2 illustrates a flowchart of an example method performed by a memory management unit in connection with a plurality of translation lookaside buffers and a plurality of switches, in accordance with the present disclosure.

FIG. 2 illustrates a flowchart of an example method 200 performed by a memory management unit in connection with a plurality of translation lookaside buffers and a plurality of switches, in accordance with the present disclosure. In one example, the steps, functions, or operations of method 200 may be performed by a computing device or system 400, and/or processor 402 as described in connection with FIG. 4 below. For example, the processor 402 and memory 404 may represent the hardware logic and a memory storing computer/hardware logic-executable instructions of an example memory management unit, in accordance with the present disclosure. For illustrative purposes, the method 200 is described in greater detail below in connection with an example performed by a memory management unit (MMU), such as MMU 111 in FIG. 1. The method begins in step 205 and proceeds to step 210.

At step 210, the MMU receives a virtual memory address (VMA) and a thread or process identifier (ID) from a processor of a central processing unit (CPU). For instance, the processor may have a memory access task such as a memory read or a memory write to perform for a process.

At step 220, the MMU forwards the process ID to a plurality of switches. For example, the plurality of switches may be grouped in a switch bank assigned to the processor. Each of the switches may include a register for storing a different process ID and may be associated with a respective translation lookaside buffer (TLB) of a plurality of TLBs that are assigned to the processor. In one example, each of the plurality of switches may compare the process ID forwarded by the MMU to the process IDs stored in the register of each switch simultaneous with the other switches/registers.

At step 230, if there is process ID match in one of the plurality of switches, the method may proceed to step 240. Otherwise, the method may proceed to step 250.

At step 240, the MMU accesses a TLB associated with the matching switch. For example, a hardware connection may be made between the MMU and the TLB via the matching switch.

At step 250, the MMU accesses an additional/shared TLB via an additional switch controlled by an open collector line. For example, the open collector line may tie together the outputs of the plurality of switches and may control the additional switch that is paired with the additional/shared TLB. When the process is not assigned a dedicated TLB, the process ID may not match any of the different process IDs stored in the plurality of switches. Thus, the open collector line may continue to float high and thereby maintain the additional switch in a closed state, providing a connection between the MMU and the additional/shared TLB. In one example, the additional/shared TLB is for storing entries mapping VMAs to PMAs for processes of the processor that are not assigned to one of the plurality of TLBs available for dedicated assignments and for which corresponding process IDs are not stored in one of the plurality of switches that are paired with the plurality of TLBs.

At step 260, the MMU may search for an entry that maps the VMA to a physical memory address (PMA) in the TLB to which the MMU is connected. The MMU may be connected to a TLB that is dedicated to the process associated with the process ID, or may be connected to an additional/shared TLB if the process is not assigned its own dedicated, or non-shared TLB. In one example, step 260 may comprise scanning entries in the TLB searching for the VMA. The entries may pair VMAs with associated respective PMAs. In the case where the MMU is accessing an additional/shared TLB, the entries may also include a process ID. For instance, the additional/shared TLB may include entries mapping VMAs to PMAs for a number of processes. Therefore, the inclusion of the process ID as an additional field in an entry enables the MMU to distinguish VMA to PMA mappings for different processes that are all sharing the TLB. If there is a matching entry found in the TLB, the method 200 may proceed to step 270. Otherwise, the method 200 may proceed to step 280.

At step 270, the MMU retrieves a PMA associated with the VMA from the TLB when the matching entry is found.

At step 280, the MMU may perform an additional task, or tasks. For instance, if a matching entry was found and the PMA retrieved at step 270, the MMU may search a memory cache for a matching entry using the PMA. For instance, the memory cache may be a physically indexed cache. In one example, the memory cache may comprises a plurality of levels. If a matching entry is found in the memory cache, the MMU may perform the memory access task with respect to the entry in the memory cache. However, if an entry is not found that matches the PMA in the memory cache, the MMU may then access a physical memory (broadly, a "memory device") using the PMA to access the correct memory location and perform the memory access task. In one example, the MMU may also write an entry to the memory cache (e.g., on a memory page basis) after accessing the memory location in the physical memory and performing the memory task.

In another example, where there is no matching entry for the VMA in the TLB, the MMU may access a L2 TLB that may store a larger number of entries. Alternatively, or in addition, the MMU may access a designated location in the physical memory that stores a page table and perform a page walk to translate the VMA into a PMA. Once the PMA is obtained, the MMU may then access a memory cache and/or access the physical memory using the PMA. In still another example, the additional task(s) of step 280 may include the MMU additionally performing the steps, functions, and/or operations of the method 300 of FIG. 3.

Following step 280, the method 200 may proceed to step 295. At step 295, the method 200 ends.

Figure 3:
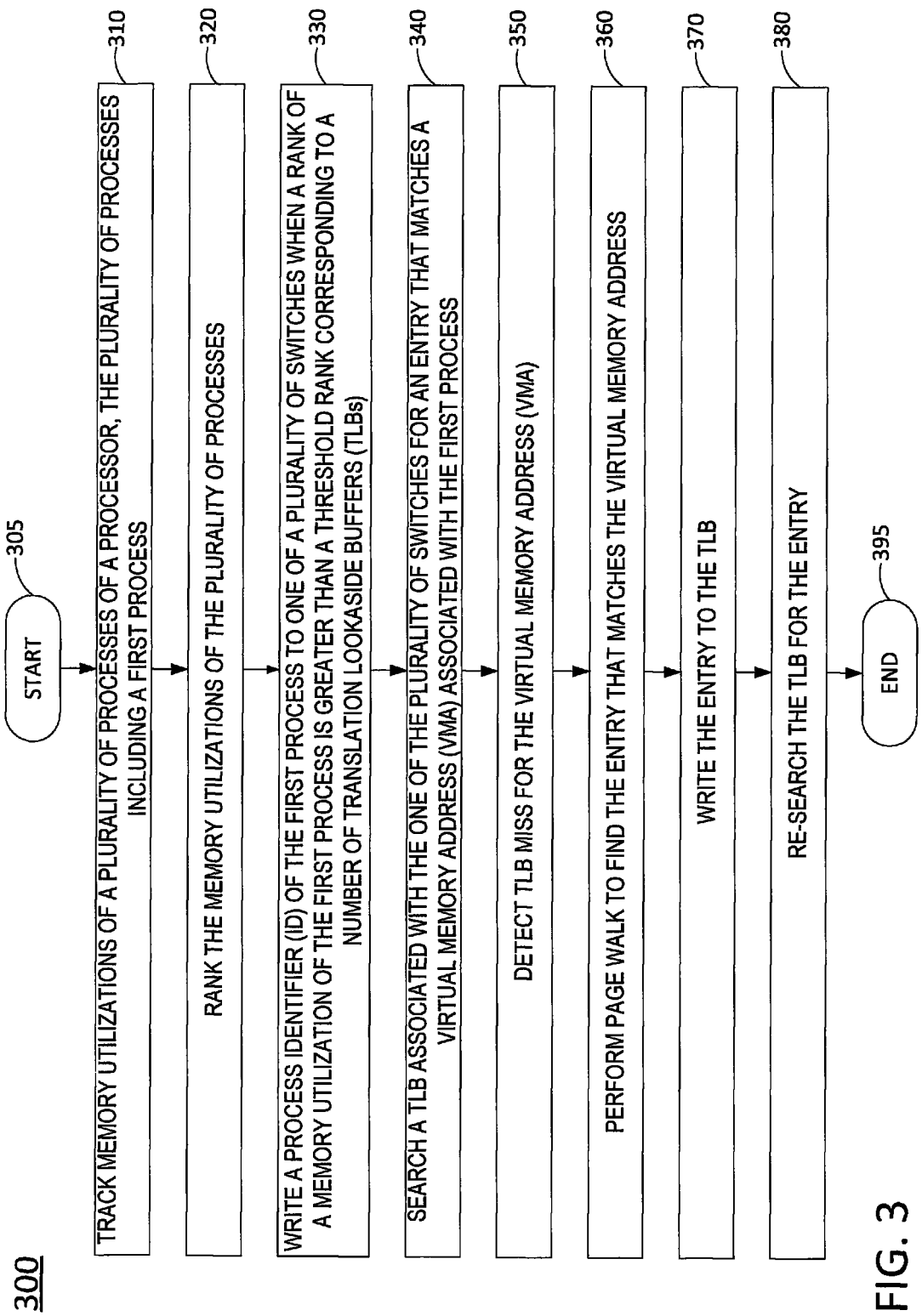
FIG. 3 illustrates a flowchart of an additional example method performed by a memory management unit in connection with a plurality of translation lookaside buffers and a plurality of switches, in accordance with the present disclosure.

FIG. 3 illustrates a flowchart of an additional example method 300 performed by a MMU in connection with a plurality of translation lookaside buffers and a plurality of switches, in accordance with the present disclosure. In one example, the steps, functions, or operations of method 300 may be performed by a computing device or system 400, and/or processor 402 as described in connection with FIG. 4 below. For example, the processor 402 and memory 404 may represent the hardware logic and a memory storing computer/hardware logic-executable instructions of an example MMU, in accordance with the present disclosure. For illustrative purposes, the method 300 is described in greater detail below in connection with an example performed by a MMU, such as MMU 111 in FIG. 1. The method 300 begins in step 305 and proceeds to step 310.

At step 310, the MMU tracks memory utilizations of a plurality of processes of a processor, where the plurality of processes includes a first process.

At step 320, the MMU ranks the memory utilizations of the plurality of processes. The rankings may be based upon a number of memory access requests, a number of read requests, a number of write requests, a volume of memory accessed, e.g., a number of kilobytes accessed, and so forth. In one example, the memory utilizations may be with respect to a sliding time window. For instance, the rankings may be based upon the number of memory access requests in the most recent 60 second interval, or the like.

At step 330, the MMU may write a process ID of the first process to one of a plurality of switches when a rank of a memory utilization of the first process is greater than a threshold rank corresponding to a number of TLBs. For instance, if there are four TLBs available to a processor/MMU and three of the TLBs are available for assignment to particular processes, then the threshold rank may be "third." In other words, when the first process has one of the top three memory utilizations of all processes running on the processor, the first process may be assigned one of the three TLBs by writing the process ID of the first process to the switch associated with the TLB. In one example, the switch and the associated TLB may be selected to assign to the first process based upon a different process previously assigned to the switch and associated TLB falling below the threshold rank in the memory utilization rankings. For instance, the first process may be a new process and/or a process with an increasing memory utilization, whereas the other process previously assigned to the switch and associated TLB may have finished or may have a declining memory utilization. In another example, the assignment of certain processes to dedicated TLBs may be based upon alternative or additional criteria such as a designation of a process as a high priority process, a large number of TLB misses and/or cache misses for the process, and so forth.

At step 340, the MMU searches the TLB associated with the one of the plurality of switches for an entry that matches a virtual memory address (VMA) associated with the first process. For instance, upon receiving a new memory access task for the first process from a processor, the MMU may submit the process ID to a switch bank including the one of the plurality of switches. Since the one of the plurality of switches includes the process ID of the first process, there will be a match and the MMU may be connected to the associated TLB which has been assigned to the first process.

At step 350, the MMU detects a TLB miss for the VMA. For example, if the TLB is newly assigned to the first process, there may be none or only a few VMA to PMA mapping entries for the first process contained in the TLB. Therefore, a TLB miss may be likely.

At step 360, the MMU may perform a page walk to find an entry that matches the VMA. For instance, the MMU may access a page table in a designated portion of a physical memory (broadly a "memory device") and traverse the page table searching for an entry for the process ID which matches the VMA to a PMA of the physical memory.

At step 370, the MMU writes the entry that is retrieved from the page table to the TLB that is associated with the one of the plurality of switches.

At step 380, the MMU re-searches the TLB for the entry matching the VMA to a PMA. Since the MMU has retrieved the entry at step 360 and written the entry to the TLB at step 370, at step 380, the entry may now be found by the MMU when searching the TLB.

Following step 380, the method 300 may proceed to step 395. At step 395, the method 300 ends.

It should be noted that although not specifically specified, one or more steps, functions or operations of the respective methods 200 and 300 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 2 or FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described methods 200 and 300 may comprise optional steps, or can be combined, separated, and/or performed in a different order from that described above, without departing from the example embodiments of the present disclosure.

Figure 4:
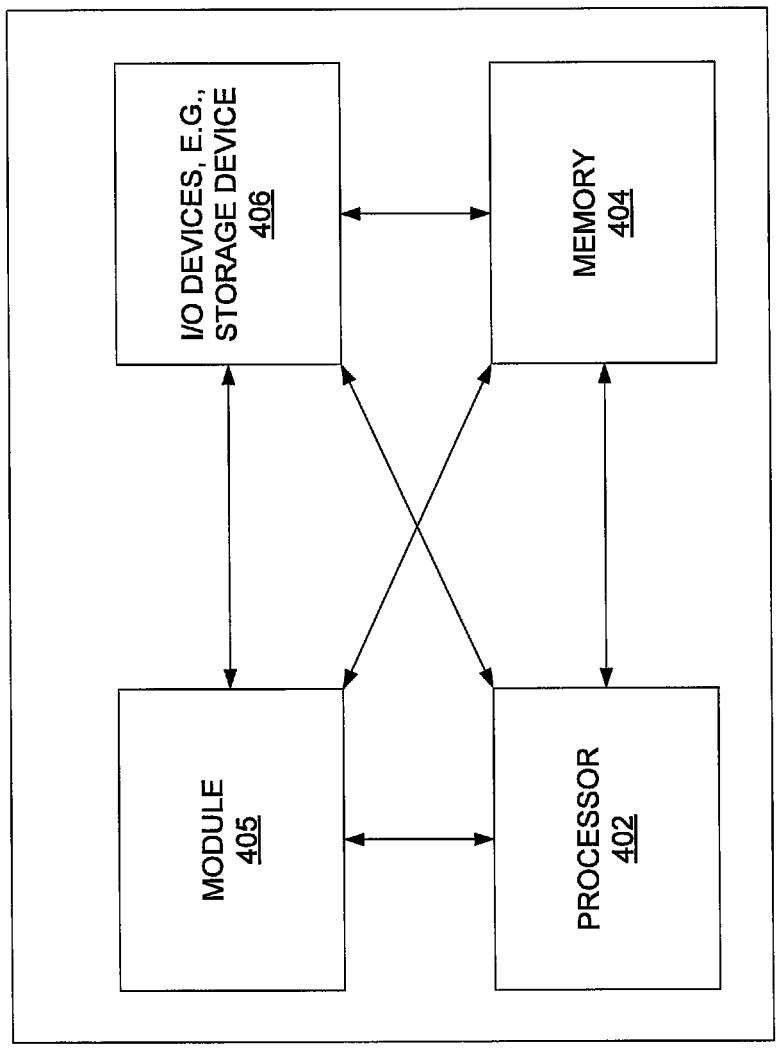
FIG. 4 illustrates an example high-level block diagram of a computer specifically programmed to perform the steps, functions, blocks, and/or operations described herein.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor, hardware logic, and so forth), a memory 404 (e.g., random access memory (RAM) and/or read only memory (ROM)), a module 405 for memory management unit operations in connection with a plurality of translation lookaside buffers and a plurality of switches, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the above method 200 or method 300, or the entire method 200 or method 300 is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device, or any other hardware equivalents, e.g., computer readable instructions pertaining to the methods discussed above can be used to configure a hardware processor to perform the steps, functions and/or operations of the above disclosed method 200 or method 300. In one example, hardware processor element 402 may function as a memory management unit of the present disclosure when used in conjunction with computer/hardware logic-executable code or instructions. For instance, instructions and data for the present module or process 405 for memory management unit operations in connection with a plurality of translation lookaside buffers and a plurality of switches (e.g., a software program comprising computer-executable instructions) can be loaded into memory 404 and executed by hardware processor element 402 to implement the steps, functions or operations as discussed above in connection with the illustrative method 200 or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for memory management unit operations in connection with a plurality of translation lookaside buffers and a plurality of switches (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:
  a processor;
  a plurality of translation lookaside buffers, wherein each of the plurality of translation lookaside buffers is to be assigned to a different process of a plurality of processes of the processor;
  a plurality of switches, wherein each of the plurality of switches comprises a register for storing a different process identifier of a plurality of process identifiers, wherein each of the plurality of switches is associated with a different translation lookaside buffer of the plurality of translation lookaside buffers; and
  a memory management unit for:
    ranking the plurality of processes based on a memory utilization over a time period; and
    assigning dynamically each one of the plurality of translation lookaside buffers to one or more of the plurality of processes based on a rank of each of the plurality of processes.

2. The device of claim 1, wherein the memory management unit is further for:
  accessing one of the plurality of translation lookaside buffers when the memory management unit is connected to the one of the plurality of translation lookaside buffers by one of the plurality of switches; and
  searching for an entry that maps a virtual memory address to a physical memory address in the one of the plurality of translation lookaside buffers.

3. The device of claim 2, wherein the memory management unit is further for:
  retrieving the physical memory address, when the entry that maps the virtual memory address to the physical memory address is found; and
  accessing the physical memory address in a memory device.

4. The device of claim 2, wherein the memory management unit is further for:
  retrieving the physical memory address, when the entry that maps the virtual memory address to the physical memory address is found; and
  searching a memory cache for an entry associated with the physical memory address.

5. The device of claim 2, wherein the memory management unit is further for:
  accessing a level 2 translation lookaside buffer to find the entry that maps the virtual memory address to the physical memory address, when the entry that maps the virtual memory address to the physical memory address is not found in the one of the plurality of translation lookaside buffers.

6. The device of claim 2, wherein the memory management unit is further for:
  performing a page walk in a page table stored in a memory device to find the entry that maps the virtual memory address to the physical memory address, when the entry that maps the virtual memory address to the physical memory address is not found in the one of the plurality of translation lookaside buffers.

7. The device of claim 1, further comprising:
  an open collector line coupled to the plurality of switches;
  an additional switch controlled by the open collector line; and
  an additional translation lookaside buffer, wherein the additional switch is for connecting the memory management unit to the additional translation lookaside buffer when a process identifier does not match any of a plurality of process identifiers stored in the plurality of switches.

8. The device of claim 1, wherein each of the plurality of translation lookaside buffers comprises a static random access memory for storing a plurality of entries mapping virtual memory addresses of a process of the plurality of processes to physical memory addresses of a memory device, wherein for each of the plurality of translation lookaside buffers, the process is associated with a process identifier of a plurality of process identifiers that is stored in the switch associated with the translation lookaside buffer.

9. The device of claim 1, wherein the ranking comprises:
  tracking the memory utilization of the plurality of processes;
  ranking the memory utilization of the plurality of processes; and
  writing a subset of process identifiers of a plurality of process identifiers to a subset of registers of the plurality of switches when the ranking of the memory utilization of a corresponding subset of processes of the plurality of processes is greater than a threshold.

10. The device of claim 9, wherein the memory management unit is further for:
  searching the translation lookaside buffer associated with one of the plurality of switches for an entry that matches a virtual memory address associated with a first process;
  detecting a translation lookaside buffer miss for the virtual memory address;
  performing a page walk in a page table stored in a memory device to find the entry that matches the virtual memory address associated with the first process;
  writing the entry that matches the virtual memory address associated with the first process to the translation lookaside buffer that is associated with the one of the plurality of switches when the entry that matches the virtual memory address associated with the first process is found during the page walk; and
  re-searching the translation lookaside buffer that is associated with the one of the plurality of switches for the entry that matches the virtual memory address associated with the first process.

11. A memory management unit comprising:
  hardware logic; and
  a non-transitory computer-readable medium storing instructions which, when executed by the hardware logic, cause the hardware logic to perform operations, the operations comprising:
    ranking a plurality of processes based on a memory utilization over a time period;
    assigning dynamically each one of a plurality of translation lookaside buffers to one or more of the plurality of processes based on a rank of each of the plurality of processes;
    accessing one of the plurality of translation lookaside buffers when the memory management unit is connected to the one of the plurality of translation lookaside buffers by one of a plurality of switches; and
    searching for an entry that maps a virtual memory address to a physical memory address in the one of the plurality of translation lookaside buffers.

12. The memory management unit of claim 11, wherein the operations further comprise:
  retrieving the physical memory address, when the entry that maps the virtual memory address to the physical memory address is found; and
  accessing the physical memory address in a memory device.

13. The memory management unit of claim 11, wherein the operations further comprise:
  retrieving the physical memory address, when the entry that maps the virtual memory address to the physical memory address is found; and
  searching a memory cache for an entry associated with the physical memory address.

14. The memory management unit of claim 11, wherein the operations further comprise:
  accessing a level 2 translation lookaside buffer to find the entry that maps the virtual memory address to the physical memory address, when the entry that maps the virtual memory address to the physical memory address is not found in the one of the plurality of translation lookaside buffers.

15. The memory management unit of claim 11, wherein the operations further comprise:

performing a page walk in a page table stored in a memory device to find the entry that maps the virtual memory address to the physical memory address, when the entry that maps the virtual memory address to the physical memory address is not found in the one of the plurality of translation lookaside buffers.

16. The memory management unit of claim 11, wherein an open collector line is coupled to the plurality of switches, wherein the open collector line controls an additional switch for connecting the memory management unit to an additional translation lookaside buffer when a process identifier does not match any of a plurality of process identifiers stored in the plurality of switches, wherein the operations further comprise:
   accessing the additional translation lookaside buffer when the memory management unit is connected to the additional translation lookaside buffer via the additional switch; and
   searching for the entry that maps the virtual memory address to the physical memory address in the additional translation lookaside buffer.

17. The memory management unit of claim 16, wherein the additional translation lookaside buffer is for storing entries mapping virtual memory addresses to physical memory addresses for processes of the processor that are not assigned to one of the plurality of translation lookaside buffers and for which corresponding process identifiers are not stored in one of the plurality of switches.

18. The memory management unit of claim 11, wherein the ranking comprises:
   tracking the memory utilization of the plurality of processes;
   ranking the memory utilization of the plurality of processes; and
   writing a subset of process identifiers of a plurality of process identifiers to a subset of registers of the plurality of switches when the ranking of the memory utilization of a corresponding subset of processes of the plurality of processes is greater than a threshold.

19. The memory management unit of claim 18, wherein the operations further comprise:
   searching a translation lookaside buffer associated with one of the plurality of switches for an entry that matches a virtual memory address associated with a first process;
   detecting a translation lookaside buffer miss for the virtual memory address;
   performing a page walk in a page table stored in a memory device to find the entry that matches the virtual memory address associated with the first process;
   writing the entry that matches the virtual memory address associated with the first process to the translation lookaside buffer that is associated with the one of the plurality of switches when the entry that matches the virtual memory address associated with the first process is found during the page walk; and
   re-searching the translation lookaside buffer associated with the one of the plurality of switches for the entry that matches the virtual memory address associated with the first process.

20. A method comprising:
   ranking, by a memory management unit, a plurality of processes based on a memory utilization over a time period;
   assigning, by the memory management unit, dynamically each one of a plurality of translation lookaside buffers to one or more of the plurality of processes based on a rank of each of the plurality of processes;
   accessing, by the memory management unit, one of the plurality of translation lookaside buffers when the memory management unit is connected to the one of the plurality of translation lookaside buffers by one of a plurality of switches; and
   searching, by the memory management unit, for an entry that maps a virtual memory address to a physical memory address in the one of the plurality of translation lookaside buffers.

* * * * *